April 27, 1965    J. H. TREECE    3,180,717
METHOD FOR FORMING A STEM AND FOOT ON STEMWARE
Filed Dec. 7, 1959    3 Sheets-Sheet 1
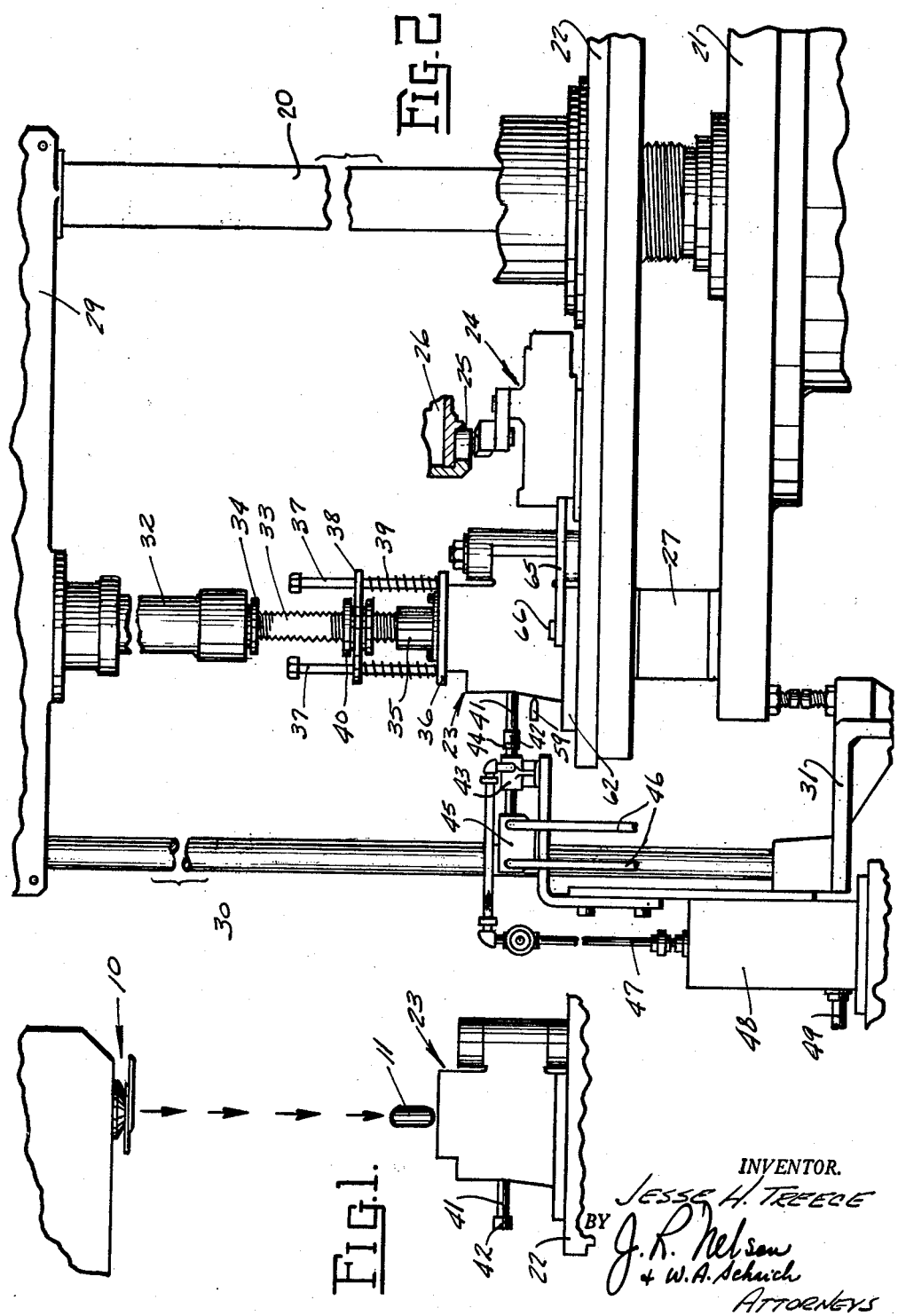
INVENTOR.
JESSE H. TREECE
BY J. R. Nelson
& W. A. Schuch
ATTORNEYS April 27, 1965  J. H. TREECE  3,180,717
METHOD FOR FORMING A STEM AND FOOT ON STEMWARE
Filed Dec. 7, 1959  3 Sheets-Sheet 2
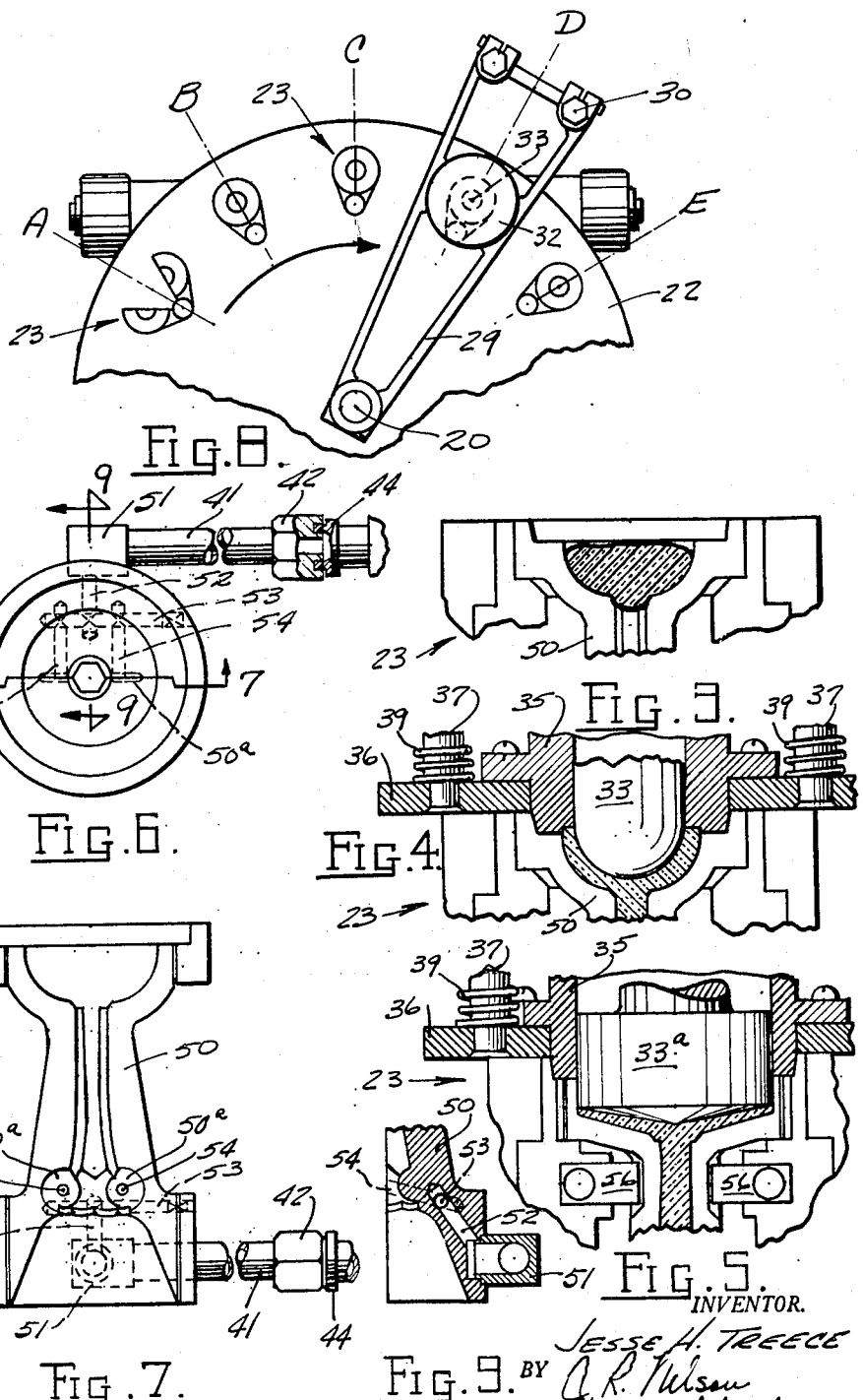

April 27, 1965   J. H. TREECE   3,180,717
METHOD FOR FORMING A STEM AND FOOT ON STEMWARE
Filed Dec. 7, 1959   3 Sheets-Sheet 3

INVENTOR.
JESSE H. TREECE
BY J. R. Nelson
and W. A. Scharich
ATTORNEYS

United States Patent Office 3,180,717
Patented Apr. 27, 1965

3,180,717
METHOD FOR FORMING A STEM AND
FOOT ON STEMWARE
Jesse H. Treece, Toledo, Ohio, assignor to Owens-Illinois
Glass Company, a corporation of Ohio
Filed Dec. 7, 1959, Ser. No. 857,650
2 Claims. (Cl. 65—48)

This invention relates to a method for forming articles of glassware known as stemware wherein its stem portion is formed and attached to its bowl portion in an operation subsequent to forming the bowl. During the attaching of the stem and bowl portions the stem-forming mold is evacuated thus enhancing the successful forming and joining of the stem to the bowl portion.

In prior methods of forming and attaching the stems to stemware, the stem portion has been press molded within a mold cavity in which the bottom of the cavity is open to receive a preformed bowl portion. In order to insure that a good bond has been accomplished between the hot stem portion and the comparatively cold bowl portion, it has been necessary to form the stem under considerable pressure. Further, when the molten glass is forced into the stem mold cavity, there has been a tendency for gases to be trapped within the mold cavity in the area adjacent the bowl and stem juncture. When gases are trapped in this area, they create bubbles which are apt to form voids in the glass resulting, not only in unacceptable ware from the standpoint of appearance but in defective ware because of an inadequate seal between the stem and bowl.

Because of the somewhat intricate designs provided in the stems at or near the juncture of the stem and bowl, there is an increased possibility for these gaseous bubbles to be formed in the glass as the result of gases trapped within the design cavities. Furthermore, stems that are formed, where there has not been a good contact between the glass and mold within the cavity mold, will result in ware that does not have a desirable luster.

U.S. Patent No. 2,327,825, issued August 24, 1943, to H. R. Schutz, is an example of the prior art method and apparatus for forming glassware articles of the stemware variety. The present invention is, therefore, an improvement of the method therein disclosed.

An object of this invention is to provide a method for applying a vacuum to the stem-forming cavity of a stem mold.

Another object of this invention is to provide a method for applying a vacuum to the stem-forming cavity in the area of juncture of the bowl and stem.

A further object of this invention is to provide a method for applying a vacuum to the stem-forming cavity of a stem mold at the same time that the stem is being press molded therein.

A still further object of this invention is to provide a method which will secure improved, and more uniformly, mold contact of the glass within the stem mold and require less shaping or forming pressure to effect this contact than was previously necessary.

The specific nature of this invention, as well as other objects and advantages thereof, will become apparent to those skilled in the art from the following detailed description thereof taken in conjunction with the annexed sheets of drawings in which, by way of example only, is illustrated one practical embodiment of this invention.

In the accompanying drawings:

FIG. 1 is a schematic elevational view of a press mold in position to receive a gob of molten glass from a feeder.

FIG. 2 is a partially schematic fragmentary elevational view of the apparatus of the invention with the mold at the pressing station.

FIG. 3 is a fragmentary elevational view of the top portion of one half of a press mold with a gob received therein.

FIG. 4 is a view similar to FIG. 3 showing one form of foot pressing plunger and its stripper plate, in section, placed in their final pressing position.

FIG. 5 is a view similar to FIG. 4, showing a second form of foot forming plunger and its stripper plate in their final pressing position.

FIG. 6 is a plan view of the mold parts of FIGS. 1, 2, and 10.

FIG. 7 is an elevational view along the mold parting line at 7—7 of FIG. 6.

FIG. 8 is a fragmentary schematic plan view of FIG. 1 illustrating the sequence of steps in forming a footed glass article.

FIG. 9 is a fragmentary sectional elevational view showing the bottom portion of one of the mold halves taken along line 9—9 of FIG. 6.

Figure 10:
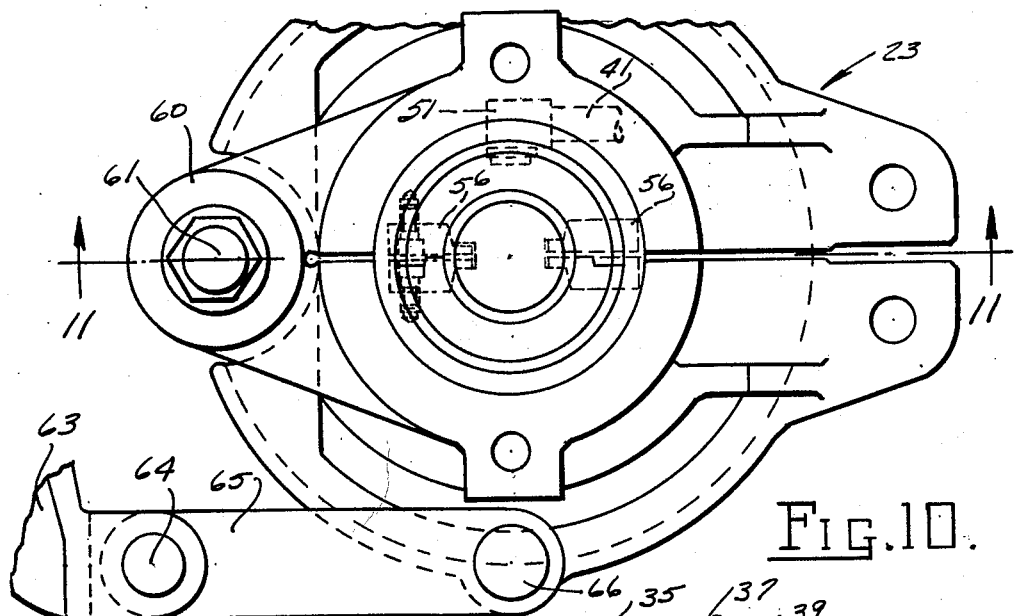
FIG. 10 is an enlarged plan view of the mold assembly in closed position.

This invention in its preferred form comprises a method for forming glass articles having bowl, stem, and footed portions wherein the bowl portion in its preformed and heated condition is confined within a mold having a communicating stem and foot forming cavity. A predetermined quantity of molten glass is delivered to the stem and foot forming cavity and, through the application of pressure, the stem and foot portion of the glass article is formed integral with the bowl portion. During the step of applying the pressure to the molten glass within the stem and foot forming cavity, the portion of the stem forming cavity adjacent the bowl is evacuated to eliminate any trapped gases thus resulting in a better finish on the stem and a better weld or connection to the bowl. The bowl portion when being introduced into the mold, should be at a temperature of at least 1000° F. After the bowl has been seated within the mold, its temperature will be somewhat reduced so that at the time that the hot glass, which forms the stem and foot portion of the article, reaches the bowl portion, the bowl will have a somewhat reduced temperature.

The apparatus for carrying out the invention generally comprises a work table for supporting the bowls to which the stems are to be attached, means for rotating the table step by step, a mold table and press molds thereon above the worktable, and means for elevating the bowls into position relative to the press molds for attachment of the stems thereto and means for evacuating the stem forming portion of the mold in a selected area.

Referring now to the drawings, first with particular reference to FIGS. 1, 2, and 8, the apparatus of the invention comprises, generally, a carriage mounted for rotation about a central stationary column or shaft 20, the carriage including a main work supporting table 21, a press mold table 22, an annular series of press molds 23, and mechanisms 24 individual to the press molds for opening and closing them under the control of a stationary cam 25. The stationary cam 25 is carried by a stationary portion 26 of the machine connected to the center column 20. Mounted on the table 21 are elevators 27, each adapted to support a workpiece or bowl 28 (FIG. 11) of the article being formed and operable to lift the bowl into position within the press mold 23 for attachment of the stem thereto. The central column 20 is supported on a base (not shown) on which is also mounted suitable driving mechanism for imparting an intermittent step by step rotation to the carriage.

A crosshead 29 is connected to the upper end of the column 20 and extends radially outward over the press mold table 22. The extending end of the crosshead 29 is supported by vertical rods 30 which are connected to a fixed portion 31 of the base of the machine. The crosshead 29 extends radially outward over the pressing station and has a hydraulic motor 32 mounted on the underside thereof. A vertical plunger 33 (see FIG. 4) is connected to the hydraulic motor 32 through an adjustable connector 34 (FIG. 2) such that upon actuation of the hydraulic motor, the plunger 33 will be moved downward and apply pressure to the molten glass within the mold 23. The plunger 33 has a surrounding sleeve 35 which cooperates with the upper peripheral rim of the press mold to form therewith a cavity for shaping the upper end of the foot and this sleeve 35 is moved with the plunger 33 so as to confine the glass within the stem and foot forming cavity (FIG. 4).

The plunger 33 has a stripper plate 36 adjustably connected thereto. The stripper plate is adapted to carry the sleeve 35 and to rest on the top of the mold 23 during the pressing operation and serves to retract the plunger a limited amount. The stripper plate 36 has a central aperture through which the plunger 33 and the plunger sleeve 35 extend. A pair of guide rods 37 are connected at their one end to stripper plate 36 and pass upwardly through a guide plate 38 (FIG. 2), the latter being adjustably positioned with respect to plunger 33 by means of a threaded adjusting and connecting hub 40. The stripper plate 36 and sleeve 35 are urged away from the guide plate 38 by means of helical springs 39 which surround the guide rods 37 and are compressed between the guide plate 38 and the stripper plate 36.

In order to provide evacuation of a selected portion of the stem forming cavity of the mold assembly, a horizontal conduit 41 projects outwardly from each mold 23. The projecting end of the conduit 41 is provided with a fitting 42 having a sealing surface thereon as best illustrated in FIG. 6. When the mold 23 is indexed to the pressing position (FIG. 2), the conduit is in axial alignment with a vacuum valve 43 having a hollow stem 44. The hollow stem 44 has an end structure that cooperates with the sealing surface on fitting 42 of the conduit 41. The valve stem 44 is moved axially through the valve housing 43 to sealingly engage the fitting 42 on conduit 41, by means of a fluid motor 45 having pressure fluid supply conduits 46 connected thereto. Fluid under pressure is delivered to the conduits 46 in timed sequence such that a vacuum is applied to the mold at the instant pressing is begun. The valve 43 has a vacuum line 47 connected thereto which is in communication with a vacuum tank 48. A suitable vacuum is maintained in the vacuum tank 48 by means of a vacuum pump or vacuum source (not shown) connected to the vacuum tank 48 through the conduit 49 connected at the lower end thereof.

Each press mold 23 carries a partible mold insert 50 (FIG. 11) which has an internal configuration that will determine the external appearance of the stem and foot portions of the article being formed. Within one half of the mold insert 50 there is provided a means for evacuating the stem forming portion of the mold inserts adjacent the juncture of the stem and the bowl.

The evacuating means, as best illustrated in FIGS. 6, 7, and 9 takes the form of an elbow fitting 51 connecting the conduit 41 to one of the mold insert halves and opening into a radially upwardly extending passage 52 provided within the mold insert 50. The passage 52 communicates at its upper end with the midpoint of a lateral passage 53 within the mold insert 50. The passage 53 has an overall length greater than the radius of the stem forming cavity. A pair of passages 54, in communication with the lateral passage 53, extends through each of the mold insert halves 50 and opens on the parting line for the mold formed by the halves. The passages 54 are thereby disposed to communicate from opposite sides of the stem forming portion of the molding cavity adjacent the juncture of the stem to the bowl. The abutting faces of the mold insert halves 50 are slightly recessed at 50a along their parting line in the zone containing the opening of the passages 54. The recesses 50a are so proportioned and of such slight depth that when a vacuum is applied to the passages 54 gases will escape from the stem forming cavity but the molten glass will not enter the recesses. These recesses extend from the open ends of the passages 54 to the stem forming cavity. The extent of coverage of the recess with respect to the stem forming cavity depends upon the extent of the area of the stem that is susceptible of entrapping gases. This structure provides a means for exhausting the stem cavity of the mold by reason of the fact that the recessed areas 50a are located adjacent the juncture between the bowl and stem forming portion of the mold cavities. The application of the vacuum to the recessed portions 50a during the pressing of the stem portion will insure that the gases are removed and by reason of its location, the "last effective" area to be evacuated will be that portion adjacent the juncture of the stem and bowl. This means that when the stem is being pressed, the glass will move downwardly and normally would trap air in the region of the juncture and stem and bowl portion. Therefore, by providing the evacuated recesses at this point, it is possible to effectively exhaust all of the air which would normally be trapped in the mold.

The mold insert halves 50 are retained within the sections of the press mold 23 by means of clamping elements 56 (FIGS. 5 and 11) fastened to the press mold sections 23 by means of screws 57.

Figure 11:
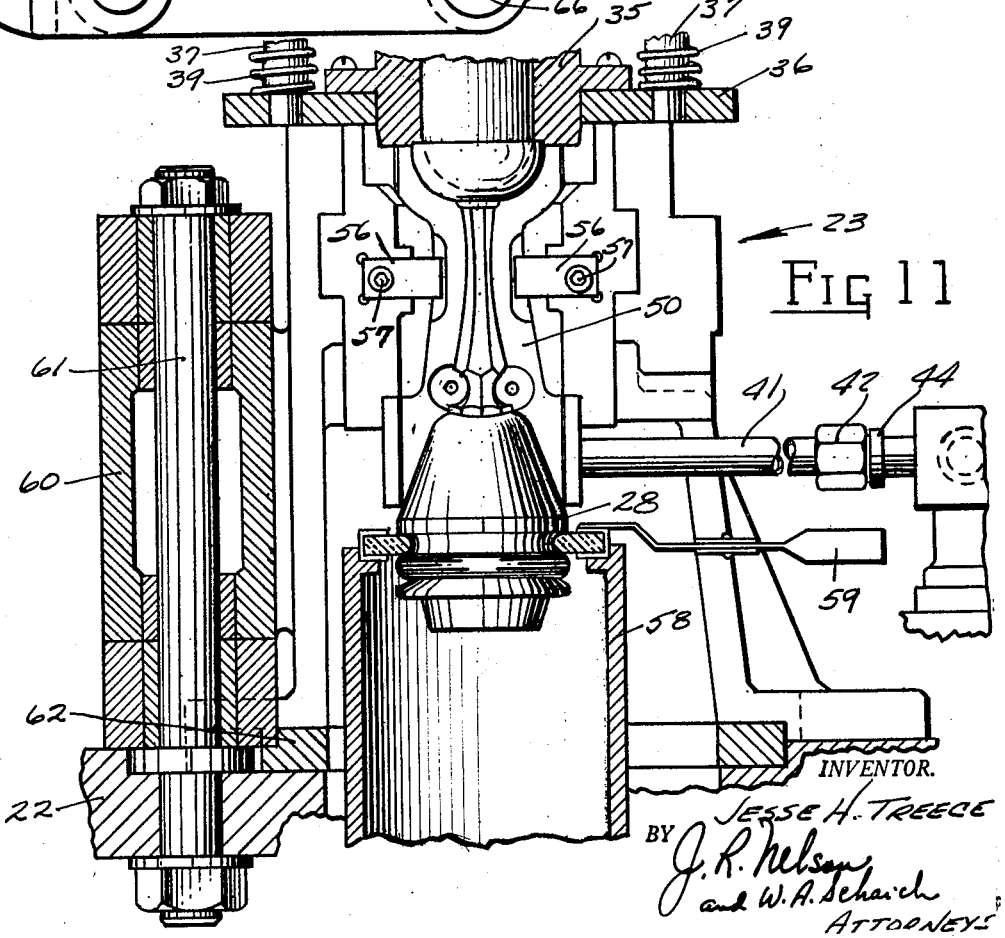
FIG. 11 is an elevational view taken along the split line 11—11 of FIG. 10 showing the parts of the mold assembly in glass pressing position.

In the operation of the device, a bowl section 28 is placed on an elevator ring 58 by means of grips 59, as shown on FIG. 11. The elevator ring 58 is connected for operation by the elevator 27, and automatically operated thereby to raise the bowl into sealing engagement within the lower bowl defining portion of the mold insert 50. The elevator mechanism will retain the bowl within the mold 50 during the feeding and pressing of the molten glass which is fed to the opposite end of the cavity of mold 50 for forming the stem and foot portions on the article.

Referring now to FIG. 8 there is schematically illustrated the various steps carried out in the formation of the stemware. The various stations of the apparatus corresponding to the operating steps are designated A, B, C, D, and E.

In the normal operation of the machine a preformed bowl will be placed on the elevator ring 58, as described, at Station A. At Station B the molds are closed and the bowl is elevated by elevator 27 into engagement within the lower portion of the mold. The mold is charged at Station C with a gob of molten glass of predetermined weight in the manner illustrated in FIG. 1, as indicated by reference numeral 11, wherein a conventional feeder 10 delivers this gob to the open upper end of the mold cavity. The mold table 22 and worktable 21 are then rotated, thus moving the mold assembly 23 to the Station D where the mold underlies the pressing plunger 33 and its associated hydraulic motor 32. The molten gob of glass is then pressed within the mold by means of the plunger 33, as illustrated in FIG. 4. At Station E, the mold is kept closed and the article is cooled prior to being removed from the mold for further processing.

The foot portion of the stemware being formed may take the shape shown in FIG. 4, wherein the end of the plunger 33 has a hemispherical shape in cooperation with the hemispherical upper portion of the cavity in the mold insert 50. As is well known in the art, a foot molded in this fashion must be subsequently reheated and formed into the final desired shape. The shaping of the foot conventionally takes place after the article has been removed from the mold. Alternatively, the foot may be shaped substantially to a final form within the mold insert 50 by providing an inverted cone shaped cavity therein which, in cooperation with a conical plunger 33a (FIG. 5), will form the foot portion essentially in its final form. FIG. 5 thus illustrates a second form of foot mold cavity in which the plunger 33a has a somewhat conical shape and the foot forming cavity of the mold insert 50 is correspondingly cone shaped to cooperate with the plunger configuration.

Each press mold assembly 23 (FIGS. 10 and 11) comprises a pair of mold sections carried on arms 60 which swing about a vertical pivot pin 61 attached to a plate 62 mounted on the table 22. Means for opening and closing the molds includes a yoke 63 connected by pivots 64 to links 65. The one end of each of links 65 is pivoted at 66 to the split mold section 23, the two sections 23 being pivoted for opening and closing movement at 61 located on the mold table. The yoke 63 is mounted for radial movement and when moved outwardly operates through the linkage just described to close the mold 23. Reference to Patent No. 2,327,825 (FIG. 2) will disclose more completely the details of this mold operating structure.

The operation of the machine will be understood from the preceding description but may be summarized as follows: While the mold carriage is at rest, a bowl 28 carried by snaps 59 (FIG. 11) is manually placed in the elevator ring 58 at Station A (FIG. 8). The mold table 22 and carriage 21 are indexed by suitable driving means bringing the holder with the bowl 28 to Station B. At Station B the mold is closed about the bowl and the bowl is elevated into position within the lower, bowl retaining, portion of the mold 23. The mold table 22 and carriage 21 are again indexed to the Station C where the mold 23 receives a charge of molten glass in the form of gob 11 from the feeder 10. After the charge has been received within the upper portion of the mold cavity, the mold 23, mold table 22 and carriage 21 are indexed to Station D where the molten glass is pressed into the stem and foot forming portions of the mold. At the same time that the molten glass is being pressed by the plunger 33, the vacuum valve 43 is connected to the conduit 41 and a vacuum is applied through the intermediary of the passages 52–54 to the area of the press mold adjacent the juncture between the stem and bowl portion of the article. This completes the forming of the stem integral with the bowl 28 and the mold table 22 and carriage 21 are then indexed to the Station E where the formed article is permitted to cool. The mold table 22 and carriage 21 will then be indexed to a position (not shown) where the molds 23 will be opened and the article will be removed for further processing.

Although the operation has been described in connection with the formation of a single article, it will be understood that each unit as it reaches the loading Station A has a workpiece or bowl 28 placed therein, so that a number of articles, corresponding to the number of molds or units, are in the process of fabrication concurrently. Thus, the apparatus is suited for continuous forming operation.

Modifications may be resorted to within the spirit and scope of the invention as set forth in the appended claims.

I claim:

1. The method of forming glass articles having bowl, stem and footed portions; comprising the steps of confining a bowl portion within a mold cavity having communicating bowl, stem and foot forming portions, said bowl being at a compatible forming temperature, charging a quantity of molten glass to the stem and foot forming portions of said cavity, substantially simultaneously press molding said charge of molten glass and exhausting said cavity, said exhaust being last effective at the area of juncture of the stem and the bowl.

2. The method of forming finished glass articles having bowl, stem and footed portions; comprising the steps of confining a preformed glass bowl portion within a mold cavity having communicating bowl, stem and foot forming portions, said bowl having a temperature compatible with forming a welded glass joint with said stem, charging the said stem and foot cavity portions with a quantity of molten glass, press molding said charge of molten glass within said cavity to form a stem and foot integral with said bowl, and specifically exhausting the area of juncture of the stem and the bowl.

References Cited by the Examiner

UNITED STATES PATENTS

| 1,436,197 | 11/22 | Rohland | 65—153 |
| 2,276,399 | 3/42 | Hrdina | 29—80 |
| 2,327,825 | 8/43 | Schutz | 65—313 |
| 2,417,328 | 3/47 | Sloan | 65—76 |
| 2,478,812 | 8/49 | Drake | 65—156 |
| 2,959,812 | 11/60 | Allen | 65—49 XR |

FOREIGN PATENTS

| 617,445 | 2/49 | Great Britain. |

DONALL H. SYLVESTER, *Primary Examiner.*

IVAN R. LADY, ARTHUR P. KENT, MORRIS O. WOLK, *Examiners.*